(12) United States Patent
Irwin

(10) Patent No.: US 9,650,104 B2
(45) Date of Patent: May 16, 2017

(54) BICYCLE TRAILER BRAKE SYSTEM

(71) Applicant: Mavis A Irwin, Carrboro, NC (US)

(72) Inventor: Mavis A Irwin, Carrboro, NC (US)

( * ) Notice: Subject to any disclaimer, the term of this patent is extended or adjusted under 35 U.S.C. 154(b) by 0 days.

(21) Appl. No.: 14/739,809

(22) Filed: Jun. 15, 2015

(65) Prior Publication Data

US 2015/0360745 A1    Dec. 17, 2015

Related U.S. Application Data

(60) Provisional application No. 62/012,029, filed on Jun. 13, 2014.

(51) Int. Cl.
| | | |
|---|---|---|
| *B62M 1/00* | (2010.01) | |
| *B62L 3/00* | (2006.01) | |
| *B60T 7/02* | (2006.01) | |
| *B60T 7/20* | (2006.01) | |
| *B60T 11/04* | (2006.01) | |
| *F16D 65/14* | (2006.01) | |
| *G05G 1/52* | (2008.04) | |
| *B62J 1/28* | (2006.01) | |
| *B62K 27/00* | (2006.01) | |
| *F16D 121/14* | (2012.01) | |
| *F16D 125/60* | (2012.01) | |
| *F16D 125/64* | (2012.01) | |

(52) U.S. Cl.
CPC  *B62L 3/00* (2013.01); *B60T 7/02* (2013.01); *B60T 7/20* (2013.01); *B60T 11/046* (2013.01); *B62J 1/28* (2013.01); *B62K 27/003* (2013.01); *F16D 65/14* (2013.01); *G05G 1/52* (2013.01); *F16D 2121/14* (2013.01); *F16D 2125/60* (2013.01); *F16D 2125/64* (2013.01)

(58) Field of Classification Search
CPC .... B62K 27/003; B62K 27/12; B62D 63/064; B62L 3/00; F16D 65/28; F16D 2121/14
USPC .... 188/2 D, 19, 20; 280/202, 204, 231, 292, 280/402
See application file for complete search history.

(56) References Cited

U.S. PATENT DOCUMENTS

| | | | | |
|---|---|---|---|---|
| 2,517,162 A * | 8/1950 | Arman | ..................... | B62M 7/14 180/15 |
| 4,448,435 A * | 5/1984 | Hon | ..................... | B62K 15/006 280/278 |
| 4,721,320 A * | 1/1988 | Creps | ..................... | B62K 27/12 280/204 |
| 5,098,113 A * | 3/1992 | Albitre | ................. | B62K 27/006 280/204 |
| 5,743,543 A * | 4/1998 | Chiu | .................... | B62K 27/006 280/231 |
| 5,860,662 A * | 1/1999 | Bartoshesky | .......... | B62K 13/02 280/204 |
| 6,527,291 B1 * | 3/2003 | Hurtig | ........................ | B62J 1/08 280/287 |
| 7,234,719 B2 * | 6/2007 | Giese | ..................... | B62K 27/12 280/292 |

(Continued)

*Primary Examiner* — Christopher Schwartz
(74) *Attorney, Agent, or Firm* — Kunzler Law Group

(57) ABSTRACT

A bicycle trailer brake includes an actuator forming a lever to actuate a brake. The actuator includes a mounting structure to couple the actuator to a bicycle or bicycle trailer and an input interface to receive an input force from a user. Upon attachment of the mounting structure to a bicycle or bicycle trailer, the input interface is positioned in a position behind and above a bicycle seat of a bicycle.

20 Claims, 6 Drawing Sheets

(56) References Cited

U.S. PATENT DOCUMENTS

| | | | |
|---|---|---|---|
| 2003/0057672 A1* | 3/2003 | Baker | B62K 13/02 |
| | | | 280/231 |
| 2011/0187072 A1* | 8/2011 | Park | B60T 7/102 |
| | | | 280/204 |
| 2015/0321727 A1* | 11/2015 | Fix | B62K 27/12 |
| | | | 280/204 |

* cited by examiner

BICYCLE TRAILER BRAKE SYSTEM

CROSS-REFERENCE TO RELATED APPLICATIONS

This application, under 35 U.S.C. §119, claims the benefit of U.S. Provisional Patent Application Ser. No. 62/012,029 filed on Jun. 13, 2014, and entitled "Bicycle Trailer Brake System," the contents of which are hereby incorporated by reference herein.

BACKGROUND

Bicycle trailers provide capability to tow cargo and passengers. The added weight of the passengers or cargo can overwhelm the braking capacity of the bicycle and create a hazard. While some conventional trailers do not have braking systems, others attempt to resolve the issue with complex trailer braking systems that must be integrated into the bicycle or some that can pose a danger to the rider.

SUMMARY

Embodiments of a bicycle trailer brake are described. In one embodiment, the bicycle trailer brake includes an actuator forming a lever to actuate a brake. The actuator includes a mounting structure to couple the actuator to a bicycle or bicycle trailer and an input interface to receive an input force from a user. Upon attachment of the mounting structure to a bicycle or bicycle trailer, the input interface is positioned in a position behind and above a bicycle seat of a bicycle. Other embodiments of a bicycle trailer brake are described.

Embodiments of a bicycle trailer brake apparatus are described. In one embodiment, the bicycle trailer brake apparatus includes an input interface to receive an input force from a user, an actuator coupled to the input interface, a mounting structure to couple the actuator to a portion of a frame of a bicycle trailer, and a brake to apply a braking force to the bicycle trailer in response to actuation of the actuator. The actuator is configured to support the input interface and actuate in response to input applied to the input interface. The input interface includes a paddle configured to be positioned behind a seat of a bicycle when the bicycle trailer is attached to the bicycle. Other embodiments of a bicycle trailer brake apparatus are described.

Embodiments of a bicycle trailer system are described. In one embodiment, the bicycle trailer system includes a frame, a bicycle attachment structure configured to facilitate attachment of the frame to a bicycle, an actuator coupled to the frame of a bicycle trailer, an input interface coupled to the actuator and configured to receive an input applied by a user to actuate the actuator and a brake to apply a braking force to the bicycle trailer in response to the input applied at the input interface actuating the actuator. The input interface includes a paddle, wherein the paddle is configured to be positioned behind a seat of a bicycle when the bicycle trailer is attached to the bicycle. Other embodiments of a bicycle trailer system are described.

Figure 1:
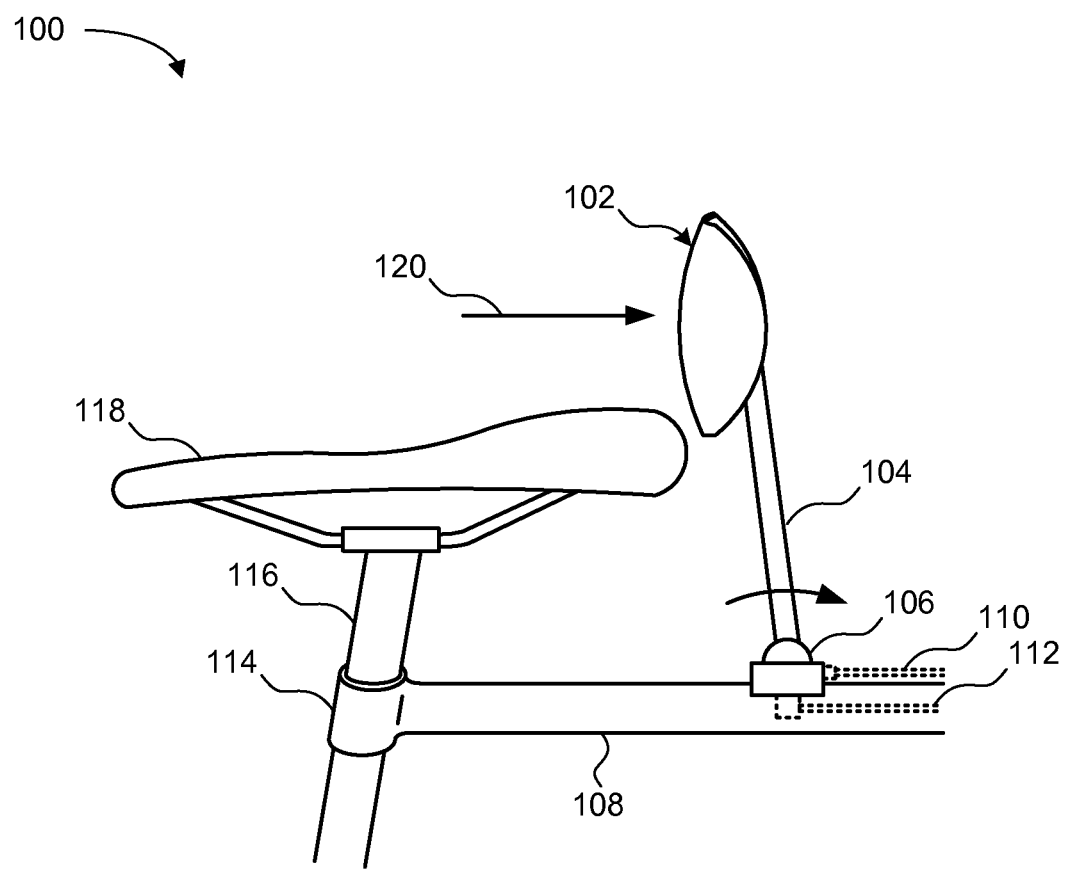
FIG. 1 depicts a schematic diagram of one embodiment of a bicycle trailer brake system.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments relate to a bicycle trailer brake system. Generally, the bicycle trailer brake system allows a rider to have brake functionality without an overly complicated system and without requiring the user to move his/her hands. Additionally, the system described below does not suffer from self-compounding braking in which the force of the initial application of the brake may cause additional braking force to be applied which may cause the rider to lose control or otherwise come into danger.

Many embodiments are described. One embodiment includes a paddle behind the seat of the rider. The paddle is activated by the rider sliding rearward on the seat and pressing the pedal rearward with the back or buttocks. This allows the rider to maintain hold of the handlebar with both hands (to potentially apply the brakes of the bicycle) and make a simple and intuitive motion to apply the brake system of the trailer.

This system also avoids a situation where the braking force might apply a compounding braking force. For example, in a surge brake system, triggering the brakes on the bicycle would cause the trailer to apply pressure to the surge brake. As pressure is applied to the surge brake, the brakes of the trailer are activated. As the braking force increases, the pressure applied to the surge system increases and the braking force increases as well. In some systems, this can cause runaway braking that transforms a gentle braking force into a self-compounding braking force that can cause a rider to lose control. Such a system would be quite dangerous. While some surge systems may not require user input, many systems need to be carefully adjusted for weight and use and can be complex, expensive, and difficult to integrate into an existing trailer. In the embodiment described below, the force applied by the rider does not compound as the rider must assertively apply the braking force. This removes the risk of compounding braking force or runaway braking. The system is also considerably simpler than surge systems and other comparable trailer brake systems.

Another embodiment includes a pedal situated at the rear of the bicycle. In this embodiment, the driver may simply remove a foot from a pedal of the drivetrain on the bicycle and apply a braking force to a braking pedal attached to the bicycle trailer. This embodiment would allow the rider to maintain contact with both hands on the handlebar and simply apply pressure to the braking pedal to apply a braking force to the bicycle trailer. Each of these embodiments is modular and does not incorporate the bicycle except to attach the trailer itself. The system is removed when the trailer is removed. Additionally, embodiments of the system allow for simple installation and removal of the system from the trailer itself. These embodiments and others are described in greater detail below.

FIG. 1 depicts a schematic diagram of one embodiment of a bicycle trailer brake system 100. The illustrated embodiment includes an input interface 102, an actuator 104, a mount 106, a trailer frame 108, an external cable location 110, an internal cable location 112, a trailer mount 114, a seat post 116, a seat 118, and an input force 120.

The illustrated embodiment of the input interface 102 is a curved paddle situated rearward from the bicycle seat 118. The input interface 102 facilitates input in the form of the input force 120 applied to the input interface 102. In the illustrated embodiment, the input interface 102 is oriented in a relatively vertical orientation. In some embodiments, the input interface 102 may be tilted forward or rearward relative to the seat 118. In some embodiments, the orientation of the input interface 102 is adjustable.

As a rider slides rearward on the seat 118, the rider applies the input force 120 at the input interface 102. In some embodiments, the input interface 102 is oriented to contact the rider's buttocks above the seat 118. In another embodiment, the input interface 102 is oriented to contact the rider's back. The input interface 102 may be located higher or lower relative to the seat 118 to provide different manners of contact and interaction with the rider.

The input force 120 on the input interface 102 actuates the actuator 104. In some embodiments, the interface between the input interface 102 and the actuator 104 is hinged to facilitate relative movement. In other embodiments, the input interface 102 and the actuator 104 are fixed relative to one another. In some embodiments, the actuator 104 is a single piece. In other embodiments, the actuator 104 may include multiple pieces. For example, the actuator 104 may include multiple bars and pins to allow the actuator 104 and the input interface 102 to follow a specific path of travel upon application of the input force 120. In some embodiments, the actuator 104 may include a force amplifier (such as a mechanical force amplifier) to amplify the input force 120 applied to the input interface 102. In some embodiments, the input force 120 may be amplified by a structure separate from the actuator 104.

In the illustrated embodiment, the actuator 104 is coupled to the mount 106. The mount 106 facilitates mounting of the actuator 104 to the frame 108. In some embodiments, the mount 106 also functions as a pivot point for the actuator 104 to facilitate applying tension to a brake cable or other force transfer mechanism.

In some embodiments, the mount 106 includes hardware to mount to the frame 108 of the bicycle trailer. For example, the mount 106 may include clamps, hooks, clasps, ties, adhesive, pins, clips, tabs, or other means for connecting the mount 106 to the frame 108.

In some embodiments, the mount 106 may route a cable along the external routing location 110. For example, if the system is retrofit to an existing trailer frame 108, the external routing location may be the easiest to install and maintain. In other embodiments, the mount 106 may route the cable along the internal routing location 112. This embodiment may be useful in systems integrated into the frame 108 at the time of manufacture. However, the internal routing location 112 may also be used in retrofit applications. In some embodiments, multiple cables may be used to facilitate force amplification, multiple brakes, or provide additional functionality.

The frame 108 may be an existing bicycle trailer frame or a frame made specifically to accommodate the mount 106 and other hardware. In some embodiments, the frame 108 includes channels and ports for cable routing locations 110 and 112. The frame 108 attaches to the seat post 116 at attachment point 114. The attachment point 114 may include mounting means similar to those described above with respect to the mount 106. In some embodiments, the attachment point 114 may be a quick-release type mechanism. In other embodiments, the attachment point 114 may have a portion mounted to the seat post 116 from which a remaining portion of the frame 108 detaches and attaches. Other embodiments may include other arrangements.

The seat post 116 supports the seat 118 relative to the input interface 102. In some embodiments, the position of the input interface 102 relative to the seat 118 is adjustable to accommodate rider preference, size, or seating position. In some embodiments, the actuator 104 is adjustable in length and tilt. Some embodiments include adjustment features for other portions or aspects of the system 100.

Figure 2:
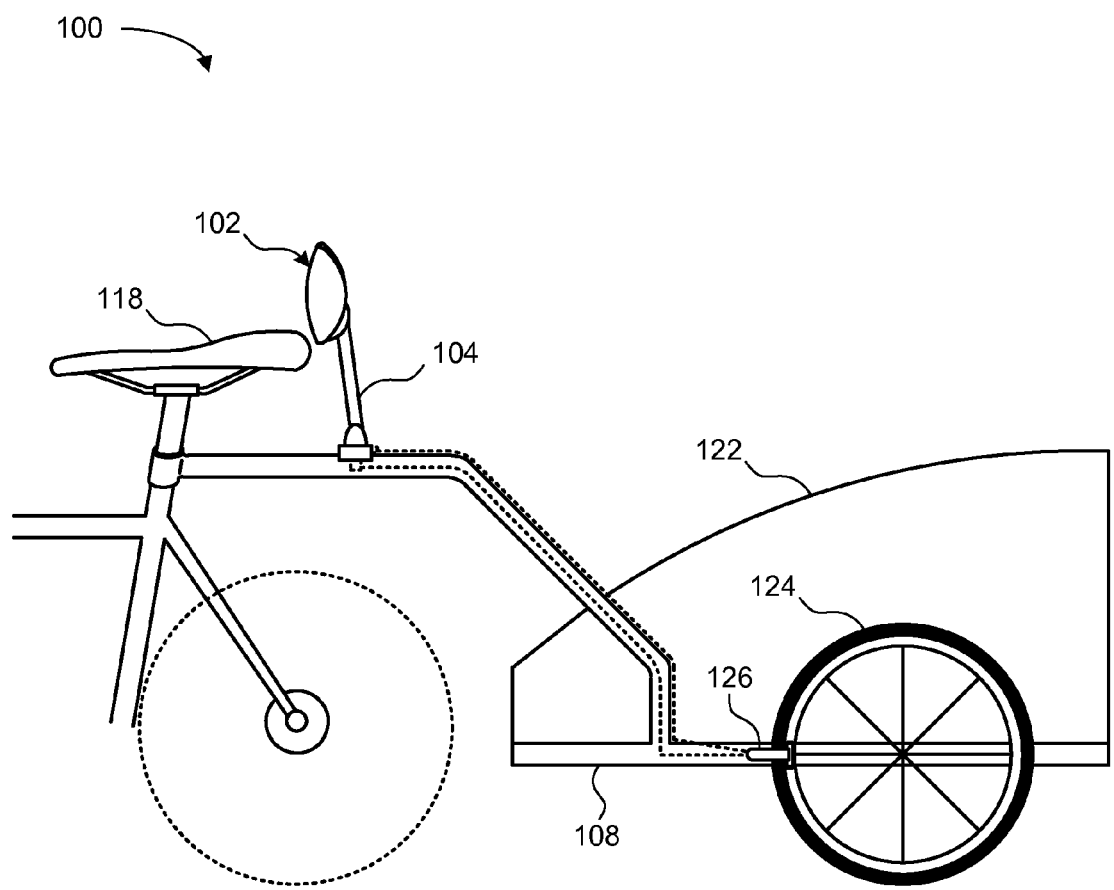
FIG. 2 depicts a schematic diagram of another embodiment of a bicycle trailer brake system.

FIG. 2 depicts a schematic diagram of another embodiment of the bicycle trailer brake system 100. The illustrated embodiment includes the input interface 102, the actuator 104, the frame 108, a trailer 122. The trailer includes wheel 124 and a brake 126.

The illustrated embodiment depicts a bicycle trailer 122 attached below the seat 118. This allows for a relatively short actuator 104 to position the input interface 102 in the correct position relative to the seat 118. The trailer 122 may be a cargo trailer or passenger trailer. The illustrated embodiment includes a single pair of wheels 124. Other embodiments may have another number of wheels 124.

The brake 126 is shown positioned to apply friction to a rim of the wheel 124. In some embodiments, the brake 126 is positioned with a separate brake disc or other friction or braking surface. For example, the brake 126 may be a friction caliper or clamp, a friction roller, a resistance roller, an electrical generator roller, a fly-wheel, or other energy absorption mechanism. In some embodiments, a brake may be situated at each wheel 124. In some embodiments, fewer than all of the trailer wheels 124. In some embodiments, one type of brake 126 is applied to at least one wheel 124 while a second type of brake 126 is applied to another wheel 124. In another embodiment, more than one brake 124 of one or more types may be applied to at least one wheel 124.

In some embodiments, the brake cable may split for each brake 126, may include multiple cables that route to each brake 126, or may include a central point for distributing force to each cable and the respective brake 126. Other arrangements for cable organizations and systems may be incorporated.

Figure 3:
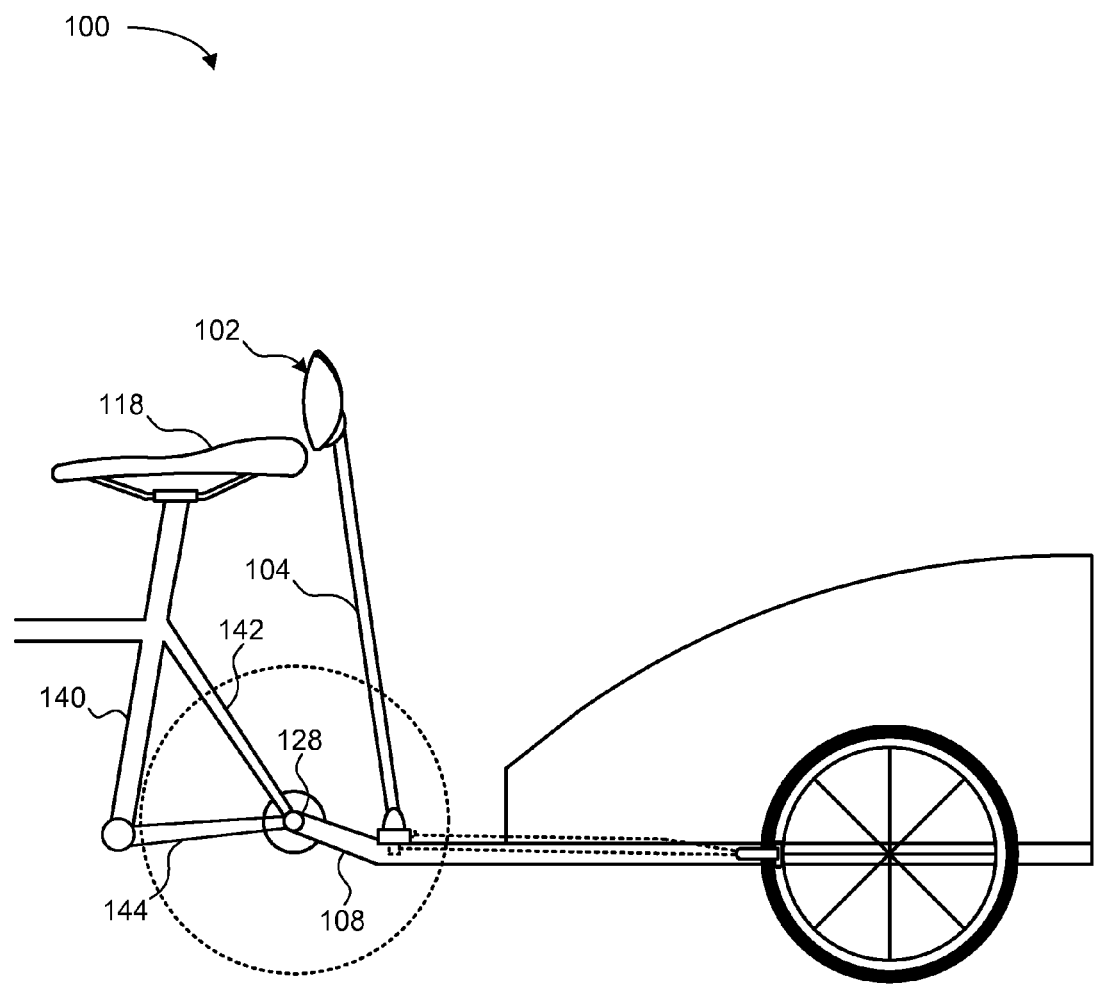
FIG. 3 depicts a schematic diagram of another embodiment of a bicycle trailer brake system.

FIG. 3 depicts a schematic diagram of another embodiment of the bicycle trailer brake system 100. The illustrated embodiment includes the input interface 102, the seat 118, the articulating structure 104, a frame 108, and a hub 128.

The illustrated embodiment depicts a frame 108 having an attachment point to connect with the hub 128 of the bicycle. In some embodiments, the frame 108 is connected to the hub 128 using the skewer of the hub 128. In other embodiments, the frame 108 is connected at the hub using additional hardware to connect to the bicycle.

In the illustrated embodiment, a longer actuator 104 is used to position the input interface 102 relative to the seat 118. In some embodiments, the actuator 104 includes additional supporting structure (not shown) to support the relatively longer length of the actuator 104.

The illustrated embodiment also depicts a seat tube 140, a seat stay 142, and a chain stay 144. In some embodiments, the actuator is mounted to the seat tube 140. In some embodiments, the actuator is mounted to the seat stay 142. In some embodiments, the actuator is mounted to the chain stay 144. In some embodiments, the actuator is mounted at more than one point on the bicycle frame or a combination of points on the bicycle frame and/or the hitch arm or frame of the bicycle trailer.

Figure 4:
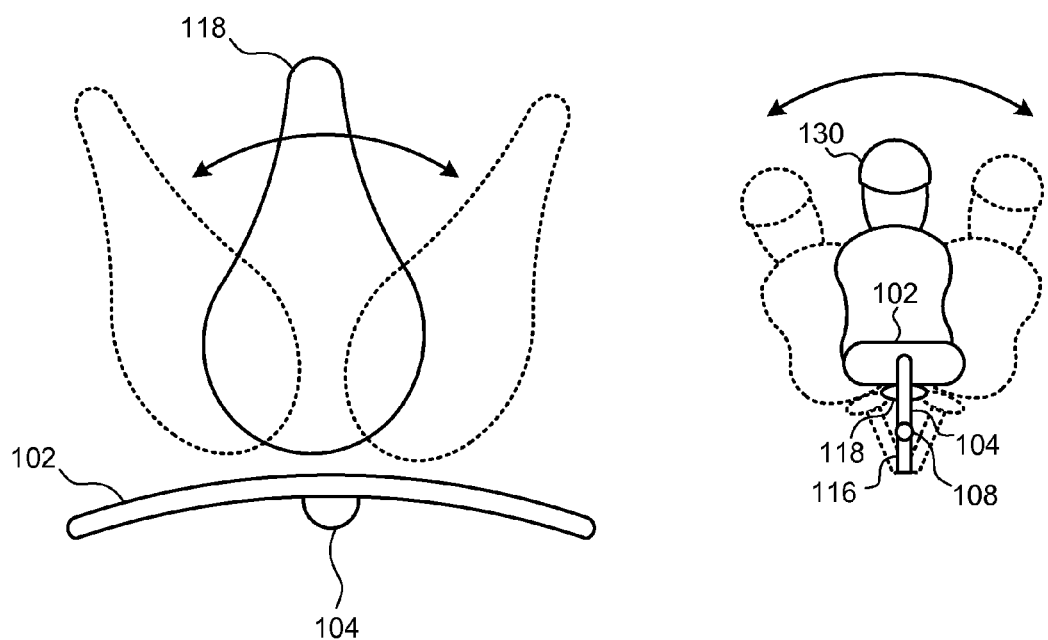
FIG. 4 depicts a schematic diagram of one embodiment of a movement accommodation aspect of the bicycle trailer brake system.

FIG. 4 depicts a schematic diagram of one embodiment of a movement accommodation aspect of the bicycle trailer brake system 100. The illustrated embodiment depicts how the input interface 102 maintains an accessible position while the seat 118 is in a range of orientations. In particular, the input interface 102 may have a curved geometry that allows a rider to interface with the input interface 102 while turning or leaning the bicycle. Because many bicycle trailers do not lean in the manner that a bicycle leans during turning and other maneuvers, the geometry of the input interface 102 may facilitate rider interaction across a range of relative movements of the seat 118. For example, the rider may take a slow turn on the bicycle which would change an angle of the seat 118 relative to the input interface 102 and a slight change in plane. If the rider were to take a harder or faster turn on the bicycle, the angle of the seat 118 would change relative to the input interface 102 as well as a more dramatic change in the plane of the seat 118 relative to the horizontal.

FIG. 4 further illustrates the relative position of the rider 130 relative to the input interface 102. As the rider 130 tilts, the input interface 102 remains behind the rider 130 maintaining accessibility without hindering his/her movements. Because many trailers do not tilt with the rider 130, the input interface 102, actuator 104, and frame 108 do not vary from the vertical orientation. However, the components of the bicycle such as the seat 118 and the seat post 116 tilt with the rider 130. The location, orientation, and geometry of the input interface 102 allows the input interface 102 to remain accessible to the rider 130 without interfering with the movement of the rider 130, the seat 118, or the seat post 116.

It is important to maintain access to braking systems during a turn because turning brings about a change in course which can introduce new hazards or conditions for which the rider may need to slow down or stop. The position and curvature of the input interface 102 facilitates access to the brake system of the trailer during these maneuvers.

Figure 5:
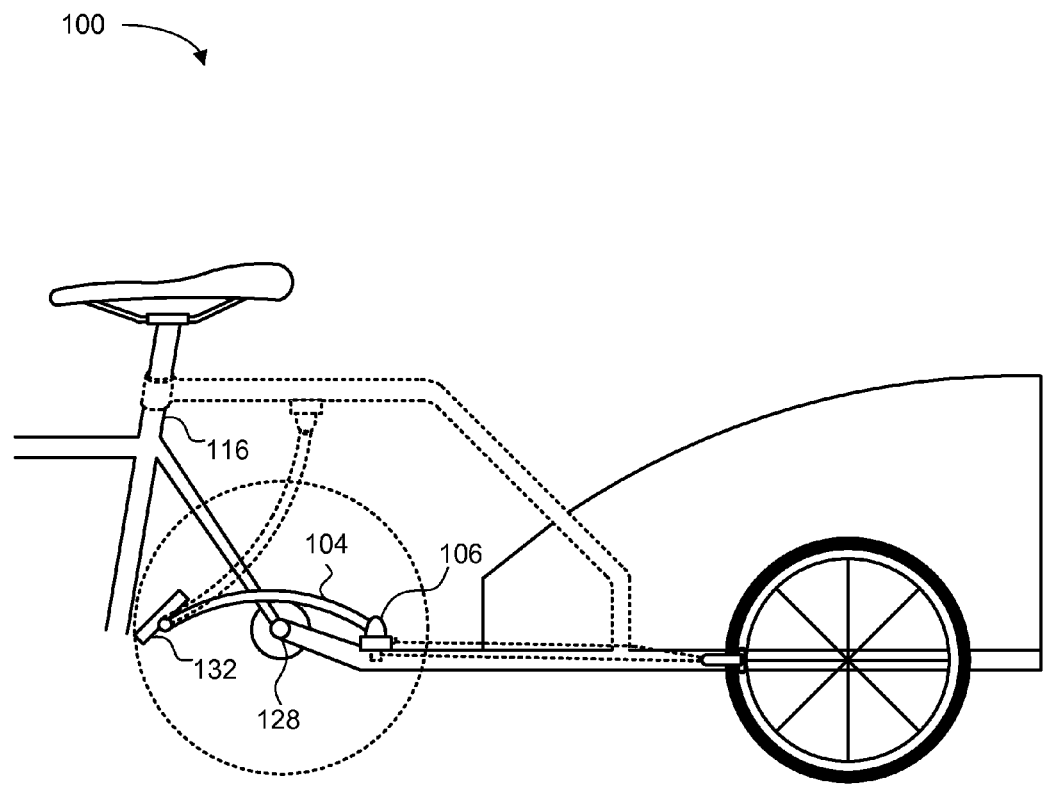
FIG. 5 depicts a schematic diagram of one embodiment of a pedal bicycle trailer brake system.

FIG. 5 depicts a schematic diagram of one embodiment of a bicycle trailer brake system 100 with a pedal 132. The illustrated embodiment depicts an arrangement that replaces the input interface 102 with a pedal 132. In one embodiment, the pedal 132 is attached to the actuator 104. Input from a rider at the pedal 132 applies a braking force to the trailer. In some embodiments, the pedal 132 is located outside of a path of travel of the pedals of the bicycle. The pedal-based brake system 100 may be incorporated with an attachment at the hub 128. Alternatively, the system 100 may be incorporated with the higher mounting just below the seat on the seat post 116 (shown in dashed lines).

In some embodiments, the pedal 132 is pressed primarily downward with a rider's foot to activate the brake system. In other embodiments, the pedal 132 is pressed primarily rearward. In some embodiments, the pedal 132 may be pressed at some other angle. In some embodiments, the pedal 132 pivots to facilitate rider input from a range of angles. The illustrated actuator 104 may include a bar-and-pin such as a four-bar mechanism to allow the pedal 132 to follow a certain path of travel when an input force is applied to the pedal 132. Other embodiments may include fewer or more components to facilitate less or more functionality.

Figure 6:
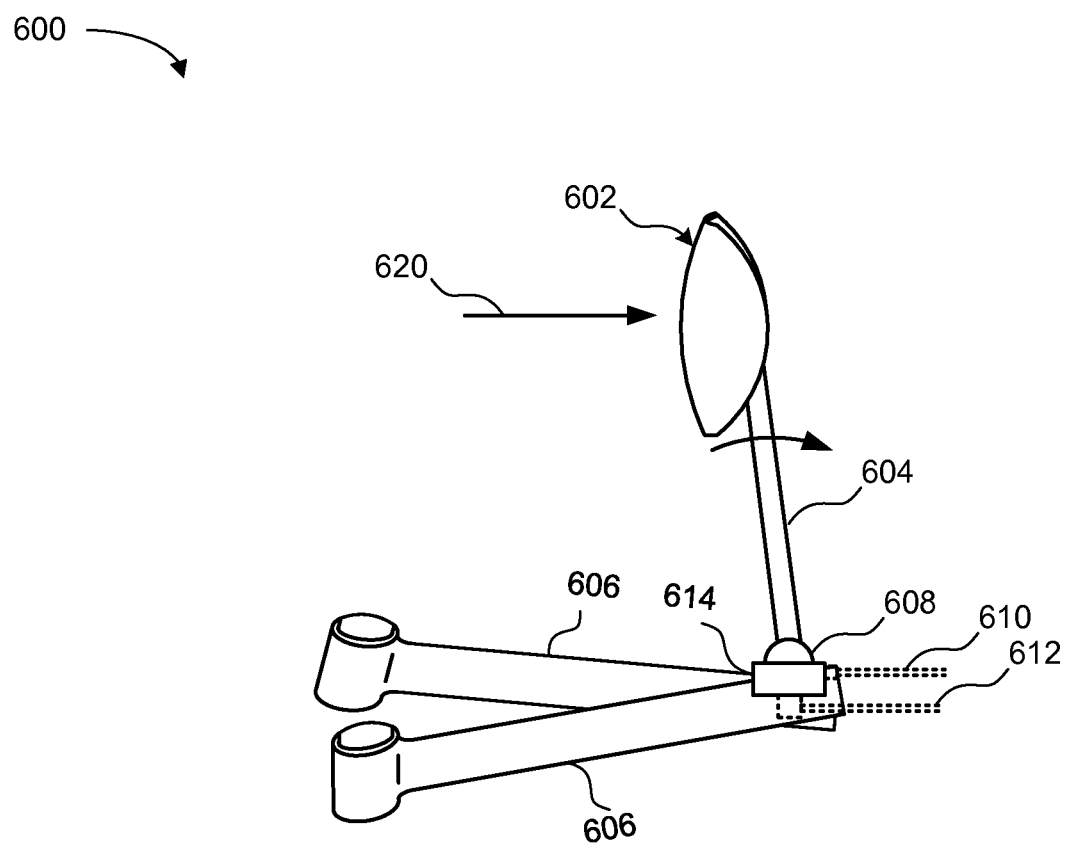
FIG. 6 depicts an embodiment of a bicycle trailer brake.

FIG. 6 an embodiment of a bicycle trailer brake 600. The illustrated embodiment includes an input interface 602, an actuator 604, mounting structures 606, a pivot 608, an external cable location 610, an internal cable location 612, a force amplifier 614, and depicts an input force 620.

The illustrated embodiment of the input interface 602 is a curved paddle. In some embodiments the paddle is situated rearward from a bicycle seat. The input interface 602 facilitates input in the form of the input force 620 applied to the input interface 602. In the illustrated embodiment, the input interface 602 is oriented in a relatively vertical orientation. In some embodiments, the input interface 102 may be tilted forward or rearward relative to a seat of a bicycle. In some embodiments, the orientation of the input interface 602 is adjustable, allowing users to adjust the orientation and position of the input interface according to the size of the user.

As a rider slides rearward on a seat, the rider applies the input force 620 at the input interface 602. In some embodiments, the input interface 602 is oriented to contact the rider's buttocks above the seat. In another embodiment, the input interface 602 is oriented to contact the rider's back. The input interface 602 may be located higher or lower relative to the seat of a bicycle to provide different manners of contact and interaction with the rider.

The input force 620 on the input interface 602 actuates the actuator 604. In some embodiments, the interface between the input interface 602 and the actuator 604 is hinged to facilitate relative movement. In other embodiments, the input interface 602 and the actuator 604 are fixed relative to one another. In some embodiments, the actuator 604 is a single piece. In other embodiments, the actuator 604 may include multiple pieces. For example, the actuator 604 may include multiple bars and pins to allow the actuator 604 and the input interface 602 to follow a specific path of travel upon application of the input force 620. In some embodiments, the actuator 604 may include a force amplifier to amplify the input force 620 applied to the input interface 602. In some embodiments, the input force 620 may be amplified by a structure separate from the actuator 604, such as a force amplifier 614.

In the illustrated embodiment, the actuator 604 is coupled to the mounting structures 606. The mounting structures 606 facilitate mounting of the actuator 604 to the frame of a bicycle or bicycle trailer. In some embodiments, a pivot 608 functions as a pivot point for the actuator 604 to facilitate applying tension to a brake cable or other force transfer mechanism.

In some embodiments, the mounting structure 606 includes hardware to mount to the frame of the bicycle or bicycle trailer. For example, the mounting structure 606 may include clamps, hooks, clasps, ties, adhesive, pins, clips, tabs, or other means for connecting the mounting structure 606 to the frame.

In some embodiments, the mounting structure 606 may route a cable along the external routing location 610. For example, if the system is retrofit to an existing trailer frame, the external routing location may be the easiest to install and maintain. In other embodiments, the mounting structure 606 may route the cable along the internal routing location 612. This embodiment may be useful in systems integrated into the frame at the time of manufacture. However, the internal routing location 612 may also be used in retrofit applications. In some embodiments, multiple cables may be used to facilitate force amplification, multiple brakes, or provide additional functionality.

A frame may be a frame made specifically to accommodate the mounting structure 606 and other hardware. In some embodiments, a frame includes channels and ports for cable routing locations 610 and 612. The frame may attach to a seat post, seat tube, seat stay, chain stay, trailer hitch arm, or another suitable location on the bicycle or bicycle trailer. In some embodiments, the attachment may be a quick-release type mechanism. In other embodiments, the attachment may have a portion mounted to a seat post from which a remaining portion of the frame detaches and attaches. Other embodiments may include other arrangements.

In some embodiments, the position of the input interface 602 relative to the seat of a bicycle is adjustable to accommodate rider preference, size, or seating position. In some embodiments, the actuator 604 is adjustable in length and tilt. Some embodiments include adjustment features for other portions or aspects of the bicycle trailer brake 600.

Some embodiments may include more than one mounting structure 606, to allow the actuator to mount at more than one attachment point on the bicycle frame and/or bicycle trailer frame. With more than one attachment point, the actuator 604 may be more stable.

Advantages of the embodiments described herein include simplicity and cost of the system, ability to control braking (versus automatic or surge systems that may cause dangerous compounding braking situations), ability to retrofit the system to an existing trailer or incorporate at trailer manufacture, and independence of trailer brake system from the bicycle systems.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A bicycle trailer brake comprising:
    an actuator forming a lever to actuate a brake, wherein the actuator comprises a mounting structure to couple the actuator to a bicycle or bicycle trailer;
    the actuator comprising an input interface to receive an input force from a user;
    wherein upon attachment of the mounting structure to a bicycle or bicycle trailer, the input interface is positioned in a position behind and above a bicycle seat and configured to receive the input force from the user when the user slides rearward off the bicycle seat to rotate the lever and actuate the brake.

2. The bicycle trailer brake of claim 1, further comprising a brake to apply a braking force to wheels of the bicycle trailer in response to actuation of the actuator.

3. The bicycle trailer brake of claim 1, the mounting structure attached to a seat post of the bicycle, and
    wherein the actuator extends vertically from the mounting structure, the actuator extending to the position above the bicycle seat.

4. The bicycle trailer brake of claim 1, wherein the actuator pivots about a fulcrum in a direction rearward of the bicycle seat,
    wherein the bicycle trailer brake further comprises a brake to apply a braking force to a bicycle trailer in response to actuation of the actuator, wherein the bicycle trailer brake further comprises a brake cable extending from the actuator to the brake, and
wherein upon a pivoting of the actuator, the actuator pulls the brake cable and the brake cable actuates the brake.

5. The bicycle trailer brake of claim 1,
wherein the mounting structure mounts to a hitch arm of a bicycle trailer,
wherein the actuator extends vertically from the hitch arm,
the actuator extending to the position behind and above the bicycle seat.

6. The bicycle trailer brake of claim 5, wherein the actuator pivots in a direction rearward of the bicycle seat, and
wherein the bicycle trailer brake actuator further comprises a brake to apply a braking force to a bicycle trailer in response to actuation of the actuator,
wherein the bicycle trailer brake actuator further comprises a brake cable extending from the actuator to the brake, wherein the brake cable follows along the hitch arm of the bicycle trailer,
wherein upon a pivoting of the actuator, the actuator pulls the brake cable and the brake cable actuates the brake.

7. The bicycle trailer brake of claim 1, further comprising a mechanical force amplifier coupled to the actuator, the mechanical force amplifier to amplify the input force.

8. The bicycle trailer brake of claim 1, wherein the mounting structure mounts to chain stays and seat stays of a bicycle frame.

9. The bicycle trailer brake of claim 1, further comprising a pivot, wherein the actuator rotates about the pivot to actuate the braking structure, wherein the actuator pivots in a direction rearward of the bicycle seat.

10. The bicycle trailer brake of claim 1,
wherein the mounting structure mounts to a seat post of the bicycle, the mounting structure extending in a direction rearward of the seat post and extending beyond a rear of the bicycle seat, and
wherein the actuator extends vertically from the mounting structure, the actuator extending to a position above the bicycle seat,
wherein the actuator pivots in a direction rearward of the bicycle seat,
wherein the bicycle trailer brake further comprises a brake to apply a braking force to a bicycle trailer in response to actuation of the actuator,
wherein the bicycle trailer brake further comprises a brake cable extending from the actuator to the brake, and
wherein upon a pivoting of the actuator, the actuator pulls the brake cable and the brake cable actuates the brake.

11. A bicycle trailer brake apparatus comprising:
an input interface to receive an input force from a user;
an actuator coupled to the input interface, the actuator configured to support the input interface and actuate in response to input applied to the input interface;
a mounting structure to couple the actuator to a portion of a frame of a bicycle trailer; and
a brake to apply a braking force to the bicycle trailer in response to actuation of the actuator
wherein the input interface comprises a paddle configured to be positioned behind a seat of a bicycle when the bicycle trailer is attached to the bicycle and configured to receive the input force from the user when the user slides rearward off the seat and makes contact with the paddle.

12. The apparatus of claim 11, wherein the input interface receives the input force from the user when the user slides toward a rear portion of the seat and makes contact with the paddle.

13. The apparatus of claim 11, wherein the input interface comprises a pedal configured to be positioned to facilitate input from the user.

14. The apparatus of claim 11, further comprising a pivot, wherein the actuator rotates about the pivot to actuating the braking structure, wherein the actuator pivots in a direction rearward of the bicycle seat.

15. A bicycle trailer system comprising:
a frame;
a bicycle attachment structure configured to facilitate attachment of the frame to a bicycle;
an actuator coupled to the frame of a bicycle trailer;
an input interface coupled to the actuator and configured to receive an input applied by a user to actuate the actuator;
a brake to apply a braking force to the bicycle trailer in response to the input applied at the input interface actuating the actuator; and
wherein the input interface comprises a paddle, wherein the paddle is configured to be positioned behind a seat of a bicycle when the bicycle trailer is attached to the bicycle and configured to receive the input force from the user when the user slides rearward off the seat and makes contact with the paddle.

16. The system of claim 15, wherein the input interface receives the input from the user when the user slides toward a rear portion of the seat and makes contact with the paddle.

17. The system of claim 15, wherein the input interface comprises a pedal configured to be positioned rearward of a seat to facilitate input from the user.

18. The system of claim 15, wherein the bicycle attachment structure is configured to facilitate attachment of the frame to the bicycle at a seat tube below a seat of the bicycle.

19. The system of claim 15, further comprising a pivot, wherein the actuator rotates about the pivot to actuating the braking structure, wherein the actuator pivots in a direction rearward of the bicycle seat.

20. The system of claim 15, wherein the bicycle attachment structure is configured to facilitate attachment of the frame to the bicycle at a hub near a wheel axis of the bicycle.

* * * * *